US010859106B1

(12) United States Patent
Wagner

(10) Patent No.: US 10,859,106 B1
(45) Date of Patent: Dec. 8, 2020

(54) DETACHABLE FASTENER

(71) Applicant: Daniel John Wagner, Cassopolis, MI (US)

(72) Inventor: Daniel John Wagner, Cassopolis, MI (US)

( * ) Notice: Subject to any disclaimer, the term of this patent is extended or adjusted under 35 U.S.C. 154(b) by 530 days.

(21) Appl. No.: 15/785,994

(22) Filed: Oct. 17, 2017

Related U.S. Application Data

(60) Provisional application No. 62/409,958, filed on Oct. 19, 2016.

(51) Int. Cl.
| F16B 21/00 | (2006.01) |
| F16B 21/02 | (2006.01) |
| A01K 39/014 | (2006.01) |
| F16B 21/12 | (2006.01) |

(52) U.S. Cl.
CPC ............ *F16B 21/02* (2013.01); *A01K 39/014* (2013.01); *F16B 21/125* (2013.01)

(58) Field of Classification Search
CPC ..... F16B 21/086; F16B 21/125; A01K 39/014
USPC ......... 411/343, 344, 551, 924.1, 937.2, 930; 403/425; 119/54, 57
See application file for complete search history.

(56) References Cited

U.S. PATENT DOCUMENTS

| 196,914 | A | | 11/1877 | Lockwood | |
| 1,349,344 | A | | 8/1920 | O'Neill | |
| 2,246,834 | A | | 6/1941 | Bowman | |
| 2,567,372 | A | | 9/1951 | Gelpcke | |
| 2,601,802 | A | | 7/1952 | Hanson | |
| 3,241,420 | A | * | 3/1966 | Passer | F16B 13/0808 411/346 |
| 3,437,742 | A | * | 4/1969 | Lindsey | H01B 17/16 174/169 |
| 4,457,653 | A | * | 7/1984 | Leib | F16B 13/0808 411/342 |
| 4,799,455 | A | * | 1/1989 | O'Kelley | A01K 5/0233 119/51.01 |
| 5,209,621 | A | | 5/1993 | Burbidge | |
| 5,702,218 | A | * | 12/1997 | Onofrio | E04B 9/006 411/341 |
| 5,738,471 | A | * | 4/1998 | Zentner | B60P 7/0807 410/101 |
| 5,779,422 | A | * | 7/1998 | Petignat | B26B 13/285 411/551 |
| 6,884,012 | B2 | * | 4/2005 | Panasik | F16B 13/0833 411/29 |
| 7,458,338 | B2 | * | 12/2008 | Keller | A01K 1/0356 119/452 |
| 7,694,447 | B1 | * | 4/2010 | Rutler | G09F 7/002 232/17 |
| 7,905,675 | B2 | * | 3/2011 | Huang | F16B 5/0642 403/168 |

(Continued)

*Primary Examiner* — Gary W Estremsky
(74) *Attorney, Agent, or Firm* — Larry E. Henneman, Jr.; Henneman & Associates, PLC

(57) ABSTRACT

A fastener for securing a first object to a second object includes a push member, a rigid shaft, an engaging member, a biasing member, and an anchor. The push member and the anchor are fixed to opposite ends of the rigid shaft. The engaging member is slideably coupled to the rigid shaft between the push member and the anchor. The biasing member is disposed between the push member and the engaging member to urge the engaging member toward the anchor. In a particular embodiment, the anchor is deployable.

63 Claims, 16 Drawing Sheets

(56) References Cited

U.S. PATENT DOCUMENTS

| | | | |
|---|---|---|---|
| 9,861,399 B2 * | 1/2018 | Rogers | A61B 17/7068 |
| 10,349,624 B2 * | 7/2019 | Worsley | A01K 5/01 |
| 2013/0223952 A1 | 8/2013 | Hickey | |

* cited by examiner

DETACHABLE FASTENER

CROSS-REFERENCE TO RELATED APPLICATIONS

This application claims the benefit of priority to U.S. Provisional Patent Application Ser. No. 62/409,958, filed Oct. 19, 2016 by the same inventor, which is incorporated herein by reference in its entirety.

BACKGROUND OF THE INVENTION

Field of the Invention

This invention relates generally to securing devices, and more particularly to devices used to secure multiple objects together. Even more particularly, the invention relates to securing objects together in pet/livestock environments.

Description of the Background Art

In the swine industry creep feeders are used to feed piglets in a farrowing crate. It is desirable that the creep feeders are attached to a wall, fence, or other border of the farrowing crate. Farmers usually care for many piglets, so it is desirable that a device used for attaching a creep feeder to a farrowing crate is simple, easy and quick to use. Typically piglets are rough on objects in the farrowing crate, so it is desirable that the device is durable. Farmers also need creep feeders to stay in place, so it is desirable that the device is dependable. Additionally, agricultural environments are often dirty. Therefore, it is desirable that a device for attaching a creep feeder is easy to wash and disinfect. What is needed, therefore, is a device for securing an object to another object (e.g. a wall) that is easy and quick to operate, durable, dependable, and easy to wash and disinfect.

SUMMARY

Various aspects of the present invention overcome problems associated with the prior art by providing a fastener for securing an object (e.g., a feeding dish) to another object (e.g. a wall) that is easy and quick to operate, durable, dependable, and easy to wash and disinfect.

Example fasteners for securing a first object to a second object are disclosed. One example fastener includes a push member, a rigid shaft, an engaging member, a biasing member, and an anchor. The push member has a first side and an opposite second side. The first side includes a surface configured to disperse force exerted thereon by a user. The rigid shaft has a first end and a second end. The first end of the rigid shaft is coupled to the second side of the push member. The engaging member is coupled to slide along the shaft, defines an aperture and includes a first side and an opposite second side. The rigid shaft extends through the aperture, and the second side of the engaging member is configured to abut a surface of the first object. The biasing member is disposed between the push member and the engaging member. The biasing member urges the engaging member along the rigid shaft in a direction away from the push member. The anchor is coupled to the second end of the rigid shaft. The anchor is also configured to pass through an opening in the first object and an opening in the second object when the anchor is in a first state. The anchor is additionally configured to prevent passage of the anchor through the opening in the first object and the opening in the second object when the anchor is in a second state. The anchor is transitionable between the second state and the first state by the user to facilitate the withdrawal of the anchor through the opening in the first object and the opening in the second object. In a particular example fastener, the outer diameter of the rigid shaft is less than half the outer diameter of the push member. Optionally, the push member includes an ellipsoidal surface. An example fastener further includes instructions for using the fastener to secure the first object to the second object between the anchor and the engaging member.

In an example fastener, the second side of the push member further includes a first biasing member seat configured to position the biasing member with respect to the push member. The biasing member is a compression spring having a first end and a second end, and the first biasing member seat is configured to seat the first end of the compression spring. The first side of the engaging member further includes a second biasing member seat configured to seat the second end of the compression spring to the engaging member. In a particular example fastener, the biasing member includes a coil spring disposed around the rigid shaft.

Another example fastener additionally includes a pull mechanism coupled to the engaging member to facilitate movement of the engaging member toward the push member and the compression of the biasing member. In a particular example fastener, the push member defines an aperture passing therethrough, and a portion of the pull mechanism is slidably disposed through the aperture defined by the push member. In another example fastener, the pull mechanism is coupled to the first side of the engaging member and defines a surface configured to be engaged by at least one of the user's fingers.

In another example fastener, the rigid shaft includes a smooth section and the engaging member is positioned to slide along the smooth section of the rigid shaft. In a particular fastener, the second end of the rigid shaft is permanently fixed to the anchor. In another example fastener, the second end of the rigid shaft includes a first set of threads and the anchor includes a second set of threads complimentary to the first set of threads. Optionally, the first set of threads can be fouled to prevent the anchor from being removed from the rigid shaft. In yet another particular example, the outer diameter of the engaging member is greater than the outer diameter of the anchor when the anchor is in the second state.

In yet another example fastener, the anchor is deployable from a loaded state to a deployed state. The anchor is in the first state when the anchor is in the loaded state and the anchor is in the second state when the anchor is in the deployed state. Furthermore, the engaging member includes a securing feature configured to secure the anchor in the loaded state. In a particular example, the securing feature includes a recess in the second side of the engaging member. In another example fastener, the second side of the engaging member defines a plurality of protrusions configured to engage the first object. In yet another example fastener, the second side of the engaging member is rectangular. Optionally, the second side of the engaging member includes a plurality of parallel ridges.

In another particular example fastener, the anchor includes a biasing member configured to automatically deploy the anchor. For example, the anchor can include a pair of hinged wings biased toward a spread position by the biasing member of the anchor. In another example fastener, the anchor includes a bend formed in the second end of the rigid shaft. In yet another particular example, the anchor includes a rigid cross-member rigidly attached to the second end of the rigid shaft. In a more particular example, the anchor is a T-member.

Methods of manufacturing fasteners for securing a first object to a second object are also disclosed. One example method includes providing a push member, a rigid shaft, an engaging member, a biasing member, and an anchor. The push member includes a first side and an opposite second side. The first side of the push member includes a surface configured to disperse force exerted thereon by a user. The rigid shaft includes a first end and a second end. The engaging member defines an aperture and includes a first side and an opposite second side. The second side of the engaging member is configured to abut a surface of the first object. The anchor is configured to pass through an opening in the first object and an opening in the second object when the anchor is in a first state and to prevent passage of the anchor through the opening in the first object and the opening in the second object when the anchor is in a second state. The anchor is transitionable between the second state and the first state by the user to facilitate the withdrawal of the anchor through the opening in the first object and the opening in the second object. The example method further includes coupling the first end of the rigid shaft to the second side of the push member. The method additionally includes disposing the biasing member between the push member and the engaging member such that the biasing member urges the engaging member along the rigid shaft in a direction away from the push member. Finally, the method includes coupling the anchor to the second end of the rigid shaft. In a more particular example, the step of disposing the biasing member between the push member and the engaging member includes placing a coil spring around the rigid shaft between the push member and the engaging member.

In a particular example method, the step of providing a rigid shaft includes providing a rigid shaft that has an outer diameter that is less than half the outer diameter of the push member. In another example method, the rigid shaft includes a smooth section disposed between the first end and the second end of the rigid shaft. Furthermore, the step of disposing the rigid shaft through the aperture of the engaging member includes disposing the smooth section of the rigid shaft through the aperture of the engaging member such that the engaging member is slidable along the smooth section of the rigid shaft.

In another particular example method, the step of providing an anchor includes providing an anchor that is deployable from a loaded state to a deployed state. The anchor is in the first state when the anchor is in the loaded state and the anchor is in the second state when the anchor is in the deployed state. In a more particular example method, the anchor includes a pair of hinged wings biased toward a spread position by a biasing member of the anchor. In another more particular example method, the engaging member includes a securing feature configured to secure the anchor in the loaded state. In a more specific example, the securing feature includes a recess formed in the second side of the engaging member.

In a particular example method, the second side of the engaging member includes a plurality of protrusions. In another particular example method, the engaging member is generally rectangular. In yet another particular example method, the second side of the engaging member defines a plurality of parallel ridges.

Example detachable container systems are also disclosed. One example system includes a container and a fastener for securing the container to an object. The container defines an opening passing therethrough. The fastener includes a rigid shaft, an engaging member, a biasing member, and an anchor. The rigid shaft has a first end and a second end. The engaging member defines an aperture and is coupled to slide along the shaft. The engaging member further includes a first side and an opposite second side, which is configured to abut a surface of the object. The rigid shaft extends through the aperture, and the biasing member is disposed between the first end of the rigid shaft and the engaging member. The biasing member urges the engaging member along the rigid shaft in a direction away from the first end of the rigid shaft. The anchor is coupled to the second end of the rigid shaft. The anchor is configured to pass through an opening in the object and the opening in the container when the anchor is in a first state, and to prevent passage of the anchor through the opening in the container and the opening in the object when the anchor is in a second state. The anchor is transitionable between the second state and the first state by the user to facilitate the withdrawal of the anchor through the opening in the container and the opening in the object.

In a particular example detachable container system, the fastener further includes a push member having a first side and an opposite second side. The first side of the push member (e.g., a handle) includes a surface configured to disperse force exerted thereon by a user. The rigid shaft extends between the second side of the push member and the engaging member.

In another particular example, the object (e.g., a cage, a pen, etc.) includes a plurality of bars, the opening in the object is a space between the bars of the object, and the second side of the engaging member is configured to engage the bars of the object. In a more particular example system, the second side of the engaging member defines a plurality of protrusions configured to engage the bars of the object. In another more particular example system, the second side of the engaging member defines a plurality of parallel ridges configured to engage the bars of the object.

In yet another example detachable container system, the anchor includes a cross member coupled to the second end of the rigid shaft and the opening in the container is an elongated aperture. Furthermore, the cross member is aligned with the elongated aperture of the container when the anchor is in the first state and the cross member is misaligned with the elongated aperture of the container when the anchor is in the second state. Even furthermore, the anchor is transitioned from the first state to the second state by rotating the rigid shaft while the rigid shaft is disposed through the opening in the object and the elongated aperture. In a more particular example, the container includes a feature for securing the anchor in the second state when the engaging member abuts the object. In a particular example system, the container is a feeder.

Methods of using a fastener to secure a first object to a second object are also disclosed. One example method includes providing the first object, the second object, and a fastener. The first object defines an opening, and the second object defines an opening. The fastener includes a push member, a rigid shaft, an engaging member, a biasing member, and an anchor. The rigid shaft has a first end and a second end, and the first end of the rigid shaft is coupled to the push member. The engaging member is coupled to slide along the shaft, the engaging member defines an aperture, and the rigid shaft extends through the aperture. The biasing member is disposed between the push member and the engaging member, and urges the engaging member along the rigid shaft in a direction away from the push member. The anchor is coupled to the second end of the rigid shaft. The anchor is configured to pass through the opening in the first object and the opening in the second object when the anchor is in a first state and to prevent passage of the anchor through the opening in the first object and the opening in the second object when the anchor is in a second state. The method further includes positioning the first object with respect to the second object such that the opening of the first object is aligned with the opening of the second object. Additionally, the method includes inserting the anchor through the opening in the first object and the opening in the second object by exerting a force on the push member to advance the shaft through the aperture in the engaging member against force exerted by the biasing member. The method also includes transitioning the anchor from the first state to the second state. Finally, the method includes releasing the force exerted on the push member to allow the biasing member to bias the anchor against a surface of the first object and to bias the engaging member against a surface of the second object.

A particular example method additionally includes exerting a second force on the push member to advance the shaft through the aperture in the engaging member against force exerted by the biasing member, transitioning the anchor from the second state to the first state, and withdrawing the anchor through the opening in the first object and the opening in the second object. In a more particular example method, the step of withdrawing includes releasing the second force exerted on the push member. In another particular example method, the push member includes a surface configured to disperse force exerted thereon by a user.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a fastener that is easy to use, dependable, durable, and easy to wash and disinfect. In the following description, numerous specific details are set forth (e.g., design of specific parts) in order to provide a thorough understanding of the invention. Those skilled in the art will recognize, however, that the invention may be practiced apart from these specific details. In other instances, details of well-known manufacturing practices and components have been omitted, so as not to unnecessarily obscure the present invention. The invention can also be used in fields other than agriculture, including, but not limited to, personal, household, general industrial, and/or any other fields where fastening of devices is desirable. In such applications, the size, strength, and other characteristics of the fastener can be scaled for the particular application.

Figure 1:
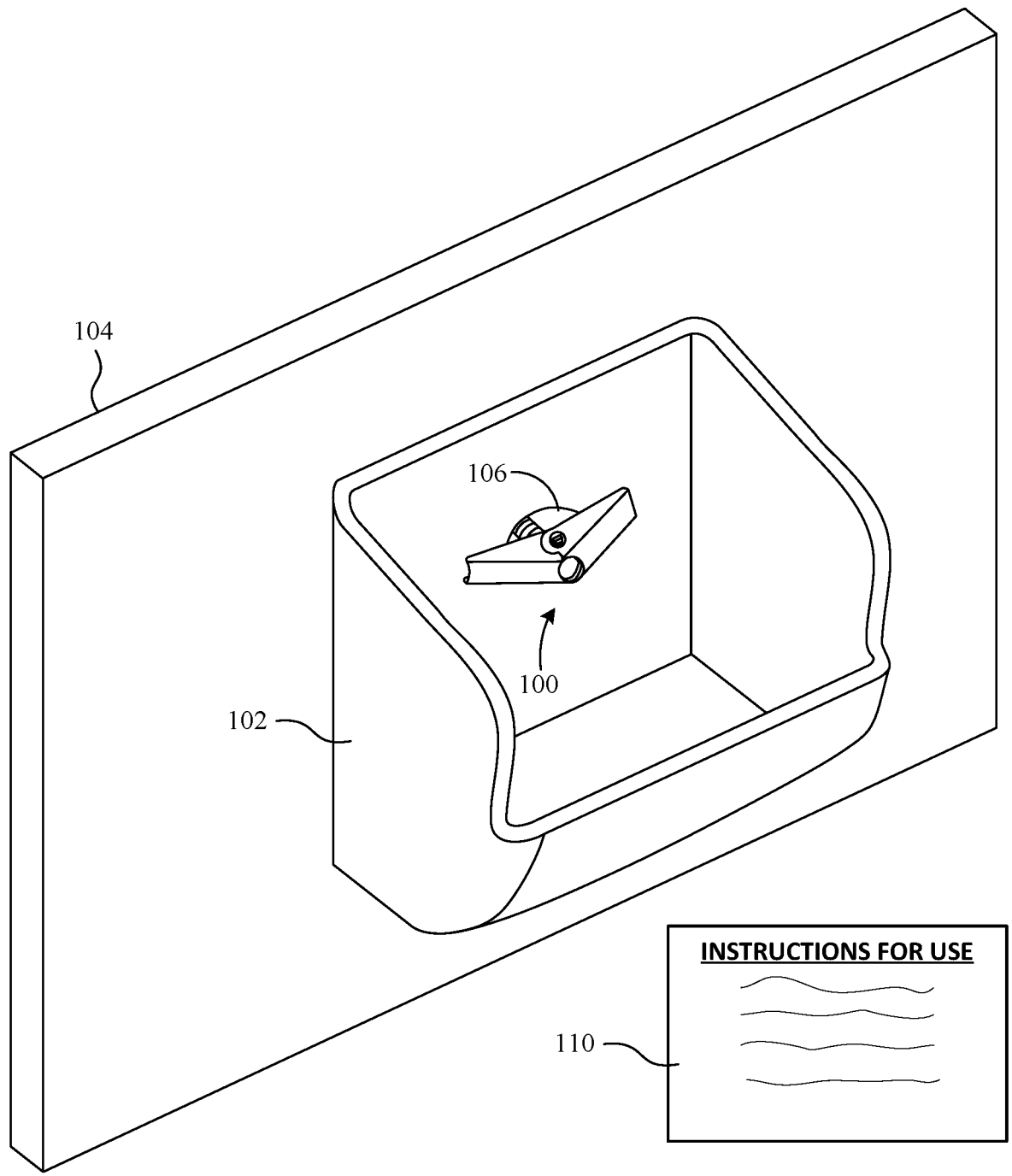
FIG. 1 is a perspective view of a fastener securing a feeder to a wall according to one embodiment of the present invention.

FIG. 1 is a perspective view of a fastener 100 shown securing a feeder 102 to a wall 104 according to one example embodiment of the present invention. Feeder 102 includes an opening 106 that is aligned with another opening 108 (shown in FIG. 2) formed in wall 104. When feeder 102 is secured to wall 104, fastener 100 is simultaneously disposed through both openings 106 and 108. In the example embodiment, feeder 102 is shown as being a creep feeder. However, feeder 102 represents any type of container (e.g., food dish, water dish, parts container, etc.) that would be desirable to removably attach to an object. Likewise, wall 104 represents any type of object (e.g., wall, cage, fence, pen, etc.) onto which it would be desirable to removably attach a container or other object. In the case of a pen, fastener 100 would pass from outside of the pen, between the bars of the pen, and through opening 106.

In the example embodiment, fastener 100 is provided in combination with instructions 110 for using fastener 100 to secure two objects together (e.g., securing feeder 102 to wall 104 via fastener 100).

Figure 2:
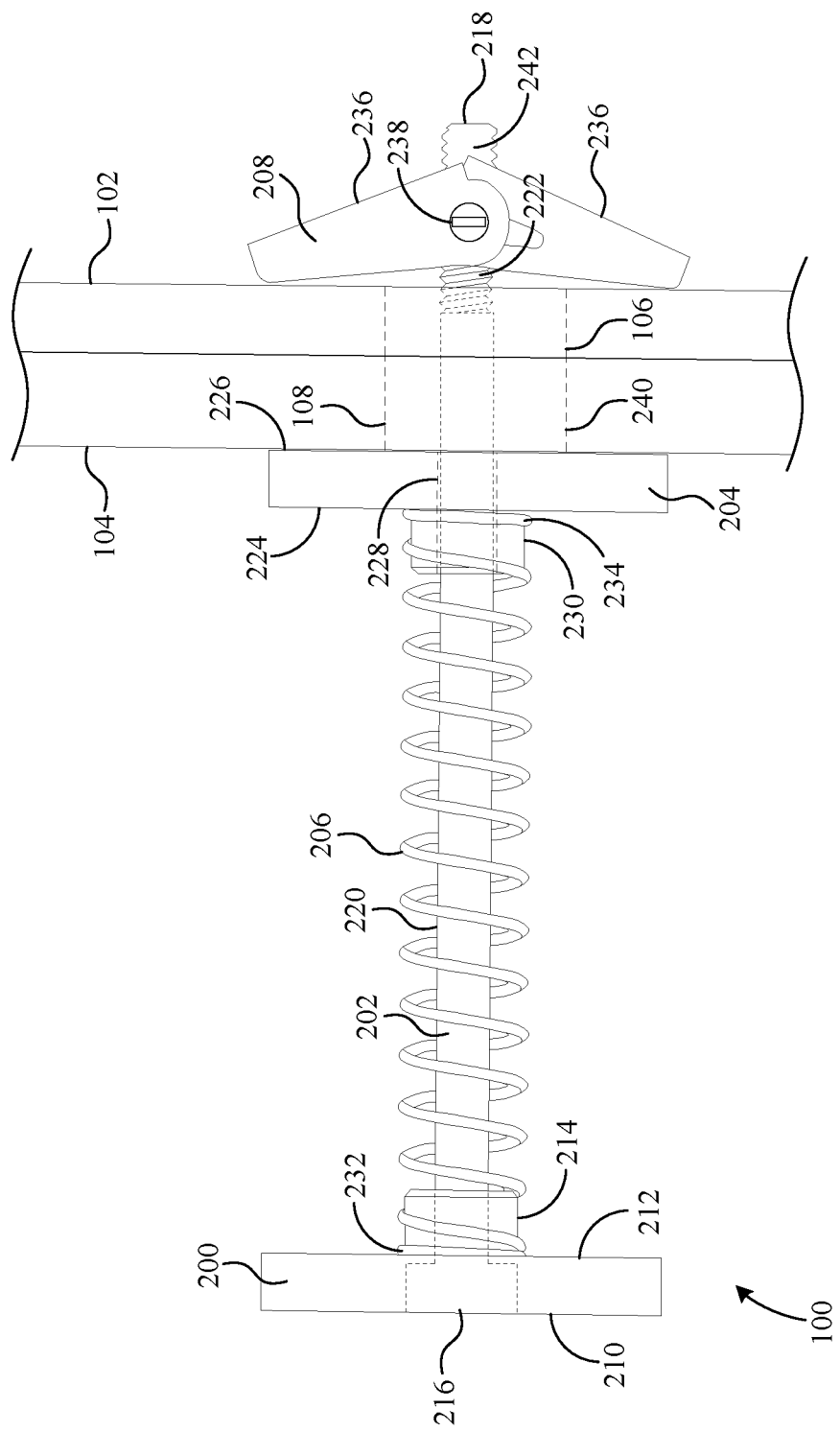
FIG. 2 is a side view of the fastener securing the feeder to the wall of FIG. 1.

FIG. 2 is a side view of fastener 100 securing feeder 102 to wall 104. Fastener 100 includes a push member 200, a rigid shaft 202, an engaging member 204, a biasing member 206, and an anchor 208. Push member 200 and anchor 208 are coupled to opposite ends of rigid shaft 202. Engaging member 204 is slidably disposed on rigid shaft 202 between push member 200 and anchor 208. Biasing member is disposed between push member 200 and engaging member 204.

Push member 200 includes a first side 210 and an opposite second side 212. First side 210 provides a relatively large flat surface configured to comfortably disperse force exerted thereon by a user's hand when push member 200 is urged against. Second side 212 includes a seat 214 onto which biasing member 206 is stabilized and centered with respect to rigid shaft 202, which passes therethrough.

In the example embodiment, rigid shaft 202 is a bolt having a first end 216, an opposite second end 218, and an intermediate section 220 disposed therebetween. First end 216 is a bolt head that is fixed to push member 200. Second end 218 includes a thread set 222 that facilitates the coupling of anchor 208 thereto. In this example, thread set 222 is intentionally obstructed (e.g., fouled, welded, capped, etc.)

after anchor 208 is threaded onto shaft 202 to prevent anchor 208 from being removed. Optionally, thread set 222 may be left intact to allow anchor 208 to be removed and replaced. Intermediate section 220 is smooth to facilitate the sliding of engaging member thereon.

As shown, the size of push member 200 is substantially larger than the diameter of shaft 202. The larger size of push member 200 disperses the force exerted against a user's hand, when the user pushes against push member 200. The larger size of push member allows push member 200 to serve as a more comfortable handle for fastener 100. Having outer diameter of shaft 202 that is less than one-half of the outer diameter of push member 200 would make push member 200 more comfortable to push on. In the example embodiment, the diameter of shaft 202 is approximately 20 percent of the diameter of push member 200. Furthermore, although push member 200 is roughly a circular cylinder in this example embodiment, alternate push members/handles of any size or shape sufficient to disperse applied forces can be used.

Engaging member 204 includes a first side 224, a second side 226, and an aperture 228 passing therebetween. First side 224 includes biasing member seat 230 onto which biasing member 206 is seated and centered with respect to aperture 228. Second side 226 is configured (e.g., smooth and flat in this example embodiment) to urge against wall 104. Aperture 228 is configured to receive intermediate section 220 of shaft 202 such that engaging member 204 can slide along intermediate section 220.

Biasing member 206 is a coil spring configured to urge engaging member 204 toward anchor 208 along shaft 202. As shown, biasing member 206 includes a first end 232 and an opposite second end 234 seated on seats 214 and 230, respectively.

Anchor 208 is fixed near an end of shaft 202 opposite push member 200. In this example embodiment, anchor 208 is a toggle anchor, which has a natural tendency to deploy as shown in FIG. 2. More specifically, anchor 208 is configured to operate in either a first state or a second state. In the first state, anchor 208 is in a loaded position (shown in FIG. 4), where it is able to pass through openings 106 and 108. In the second state (shown in FIG. 2) anchor 208 is in a deployed position where it cannot be retracted through openings 106 and 108, but instead securely engages feeder 102. Anchor 208 includes a pair of wings 236 pivotally coupled to a threaded coupler 238, which engages thread set 222. Optionally, wings 236 can be pivotally coupled to an alternative coupler that is rigidly fixed to shaft 202. Each of wings 236 is in contact with a torsion spring (FIG. 3B), which tends to force wings 236 apart. When anchor 208 is forced through a hole, wings 236 pivot towards one another (against the force of the torsion spring) to minimize the cross-sectional area of anchor 208. When anchor 208 clears the hole (i.e. openings 106 and 108), the torsion spring forces wings 236 apart, making the cross sectional area of anchor 208 too large to fit back through the hole without an intervening agent (e.g. a user) forcing wings 236 together.

Fastener 100 is configured to secure feeder 102 to wall 104 by simultaneously urging engaging member 204 against wall 104 while pulling feeder 102 toward wall 104. In other words, feeder 102 and wall 104 are sandwiched between engaging member 204 and anchor 208 via spring force exerted thereon from biasing member 206. Anchor 208 is on the opposite side of openings 106 and 108 of feeder 102 and wall 104, respectively, from engaging member 204. The force provided by biasing member 206 biases engaging member 204 and anchor 208 toward one another and against surfaces of wall 104 and feeder 102, respectively. Biasing member 206 forces engaging member 204 away from push member 200. Because anchor 208 is disposed on the opposite end of biasing member 206 from push member 200, biasing member 206 also forces engaging member 204 toward anchor 208. The combination of biasing member 206 and push member 200 creates a squeezing force between engaging member 204 and anchor 208. This squeezing force holds feeder 102 against wall 104. In some cases, the biasing force provided by biasing member 206, and resulting frictional forces between engaging member 204, wall 104, feeder 102, and anchor 208, will be sufficient to hold feeder 102 in place. In other cases, feeder 102 may be too heavy, in which case, shaft 202 can rest on a bottom edge 240 of opening 108, holding feeder 102 in place.

In the example embodiment biasing member 206 is a compression spring with a relatively high spring constant. This particular element, as well as other described elements, is not an essential element of the present invention. For example, biasing member 206 can be replaced by another type of biasing member coupled between engaging member 204 and push member 200 or between engaging member 204 and anchor 208. Additionally, coupler 238 is screwed onto the end of shaft 202, which is fouled 242 to prevent coupler 238 from disengaging shaft 202. In alternate embodiments, coupler 238 can be integral or permanently fixed to shaft 202. Shaft 202 can also be replaced by another rigid member, with different characteristics than shaft 202. The length of the shaft 202 can be altered to achieve the desired amount of travel of anchor 208. These and other deviations from the particular embodiments shown will be apparent to those skilled in the art, particularly in view of the present disclosure.

Figure 3A:
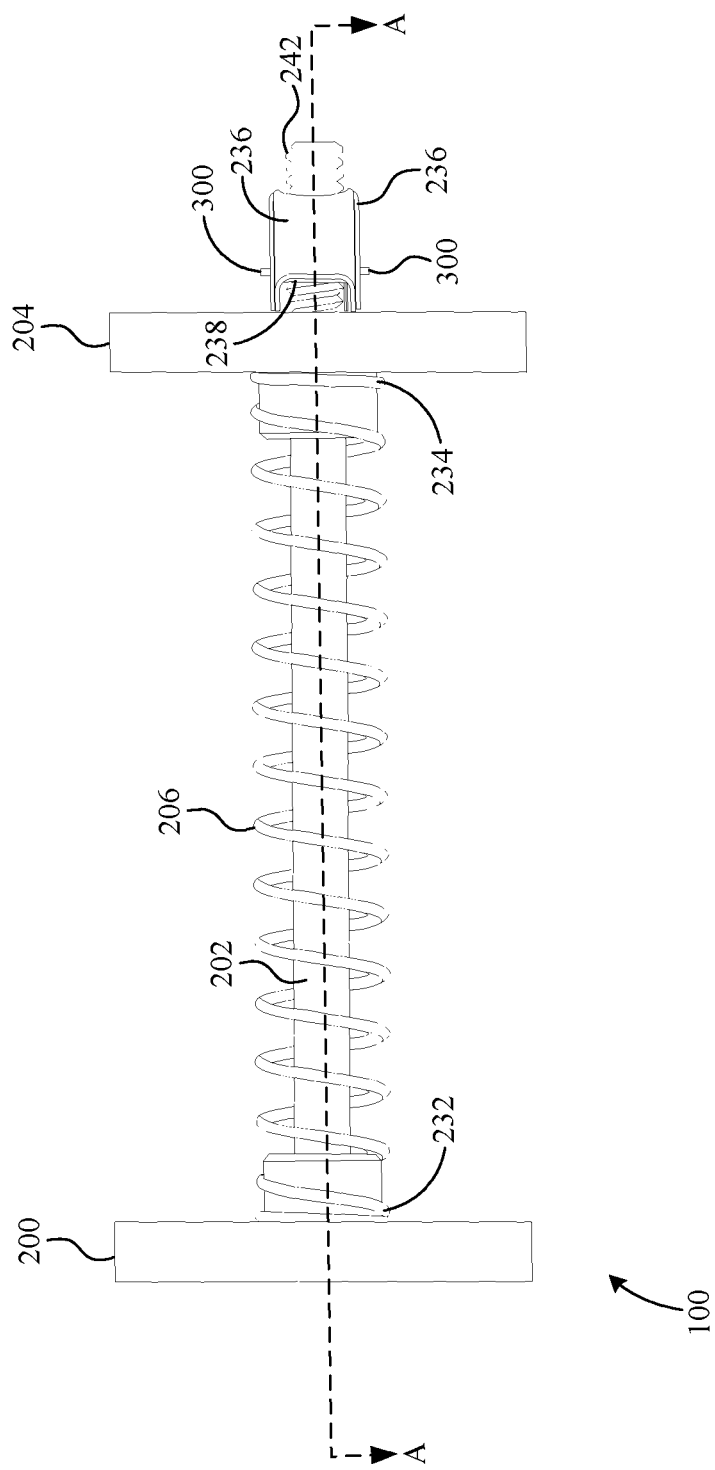
FIG. 3A is a side view of the fastener of FIG. 1 in a deployed position.

FIG. 3A is a side view showing fastener 100. Because anchor 208 and push member 200 are not separated by a wall, biasing member 206 is in a more relaxed state and urges anchor 208 directly against engaging member 204. Additionally, anchor 208 is visible from a different angle, showing wings 236 and a lower edge of coupler 238. Extensions 300 of coupler 238 are also shown engaging wings 236.

Figure 3B:
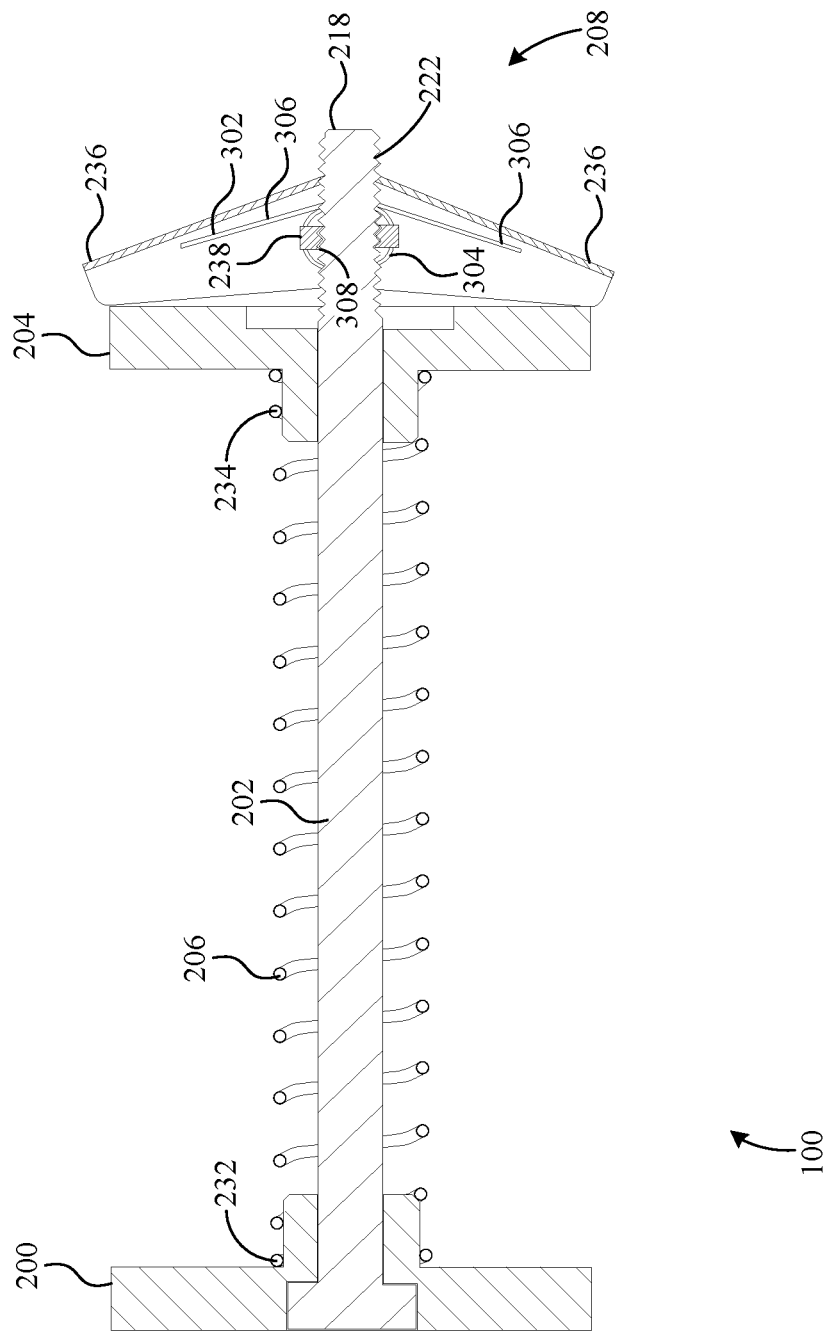
FIG. 3B is a cross-sectional side view of the fastener of FIG. 1 in a deployed position, taken along line A-A of FIG. 3A.

FIG. 3B is a sectional view, taken along line A-A of FIG. 3A, showing fastener 100, including anchor 208 in greater detail. Anchor 208 includes wings 236, which each have a horseshoe-shaped cross section along their width. Wings 236 are held apart by a torsional spring 302, which includes a winding 304 and a pair of legs 306, which extend toward the distal ends of each of wings 236. Winding 304 stores the torsional energy of spring 302. Legs 306 apply the restoring force of spring 302 to the wings 236 forcing them open, unless impeded by another force. Additionally, winding 304 is disposed adjacent coupler 238 and between wings 236 and shaft 202. Coupler 238 includes a threaded aperture 308, which is complementary to thread set 222 of shaft 202 and engages coupler 238 to shaft 202.

Figure 4:
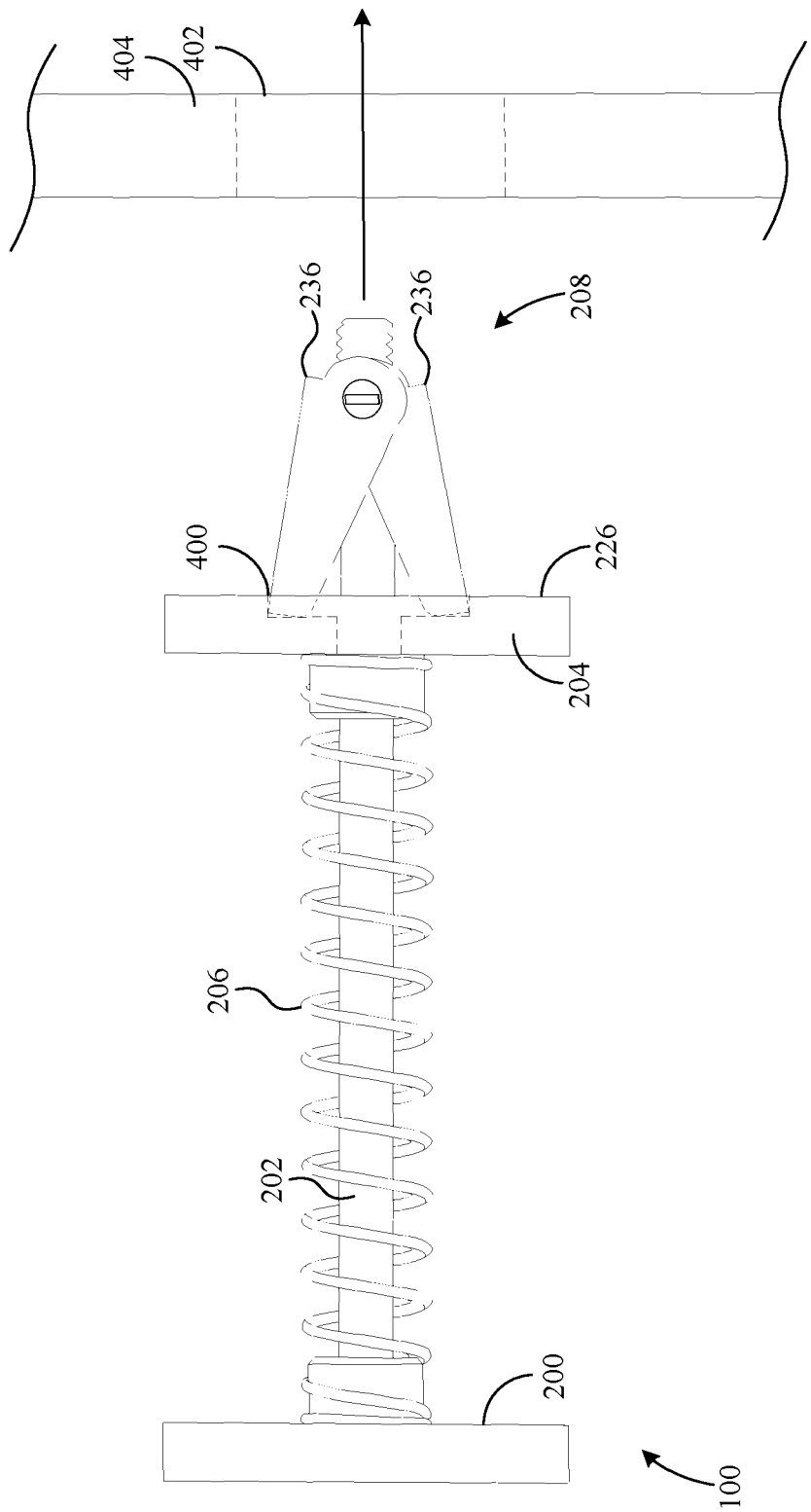
FIG. 4 is a side view of the fastener of FIG. 1 being inserted in a loaded position.

FIG. 4 is a side view showing fastener 100, including anchor 208 in a first state, wherein anchor 208 is in a retracted, loaded configuration. Wings 236 are folded inward, against the force of torsional spring 302 (FIG. 3B). The distal ends of wings 236 are held in place by a securing feature which, in this example, includes the sidewall of a circular recess 400 formed in the second side 226 engaging member 204. When fastener 100 is pushed through an opening 402 in a wall 404, anchor 208, in the retracted loaded configuration, passes easily through. However, engaging member 204 cannot pass through opening 402. So, a continued force on fastener 100 pushes engaging member 204 toward push member 200 and compresses biasing member 206. Continued movement of wings 236 through opening 402 in combination with the stoppage of engaging member 204 by wall 404, causes the ends of wings 236 to disengage circular recess 400. Then, when wings 236 are pushed completely through opening 402, wings 236 will open under the force of torsional spring 302. When wings 236 are open, anchor 208 is too large to fit back through opening 402. Thus, fastener 100 is in the second (deployed) state, where it is locked in place by releasing the force applied to push member 200.

Figure 5A:
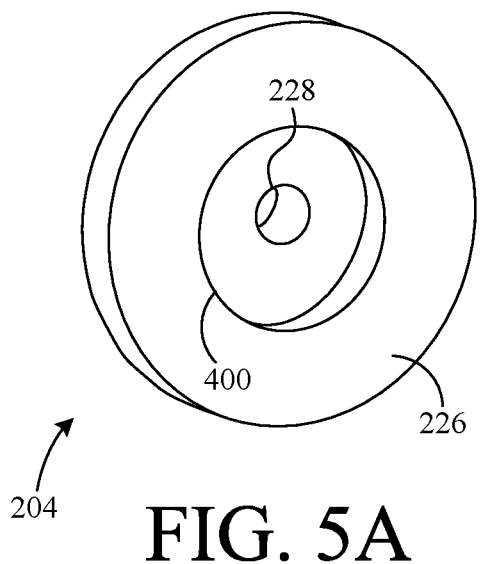
FIG. 5A is a front perspective view of the engaging member of the fastener of FIG. 1.

FIG. 5A is a perspective view of the front side of engaging member 204. Engaging member 204 is a circular plate formed, for example, from plastic. Engaging member 204 includes aperture 228 and circular recess 400. FIG. 5B is a perspective view of the back side of engaging member 204. Engaging member 204 includes biasing member seat 230 configured to engage biasing member 206 (FIG. 2).

Figure 5C:
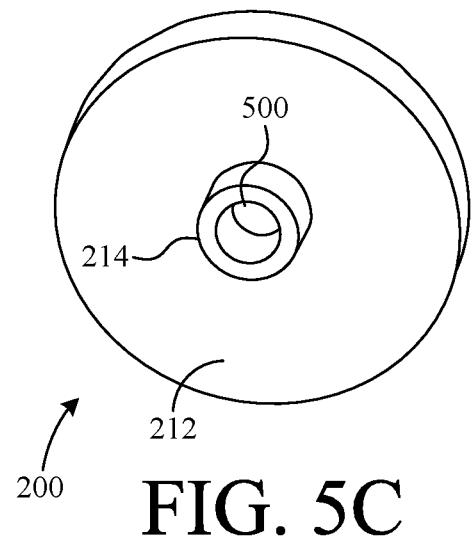
FIG. 5C is a front perspective view of the push member of the fastener of FIG. 1.
Figure 5B:
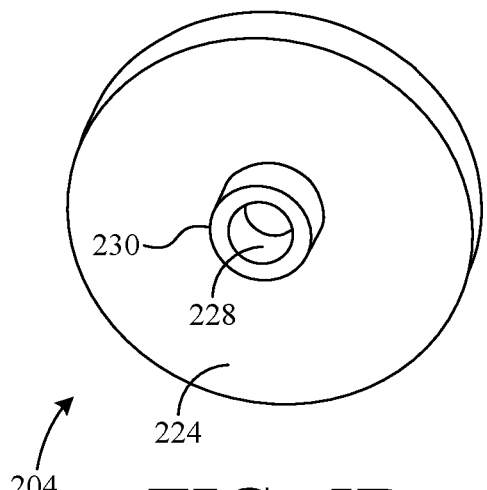
FIG. 5B is a rear perspective view of the engaging member of the fastener of FIG. 1.
Figure 5D:
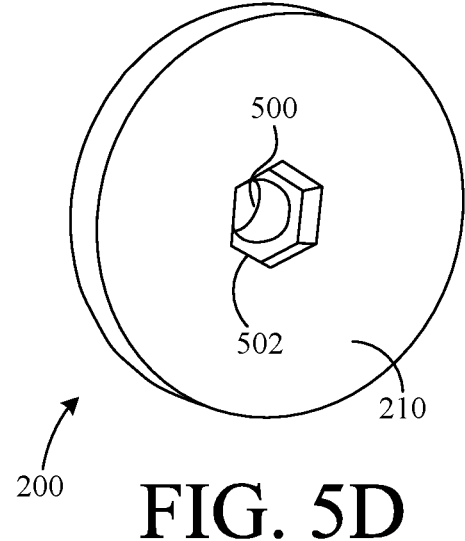
FIG. 5D is a rear perspective view of the push member of the fastener of FIG. 1.

FIG. 5C is a perspective view of the front side of push member 200. Push member 200 is a circular plate formed, for example, from plastic. Push member 200 includes an aperture 500 and biasing member seat 214 adapted to engage biasing member 206 (FIG. 2). FIG. 5D is a perspective view of the first (rear) side 210 of push member 200. First side 210 of push member 200 includes a hex-shaped recess 502 adapted to receive the hex head of shaft 202 (FIG. 1).

In the example embodiment, engaging member 204 and push member 200 are formed from black plastic. In alternate embodiments, engaging member 204 and push member 200 can be painted or otherwise decorated to personalize them for individual users. Additionally, engaging member 204 and push member 200 can be formed from other materials, including, but not limited to, stainless steel, aluminum, or other metals. Biasing member seats 214 and 230 can also be replaced by a circular channel or omitted entirely. As another option, push member 200 can be formed integrally on first end 216 of shaft 202 (FIG. 2).

Figure 6A:
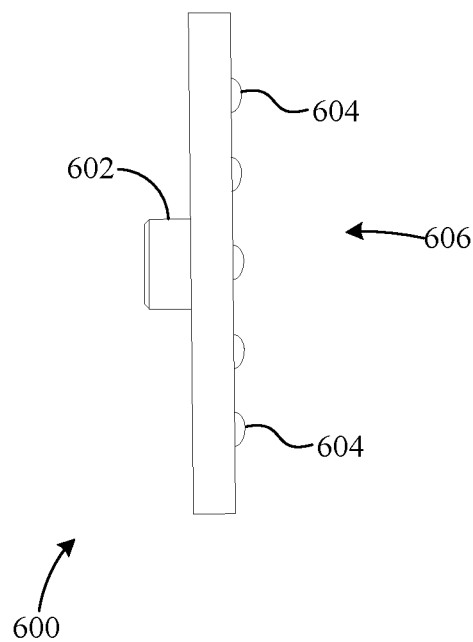
FIG. 6A is a side view of an alternate engaging member.
Figure 6B:
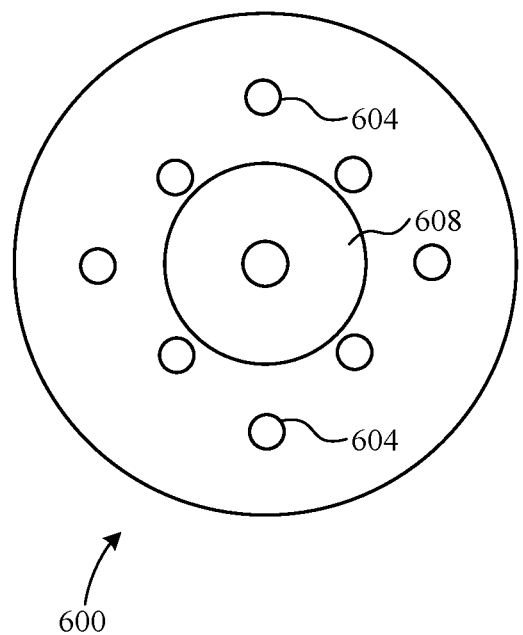
FIG. 6B is a front view of the alternate engaging member of FIG. 6A.

FIG. 6A is a side view showing an alternate engaging member 600. Engaging member 600 includes a biasing member seat 602 for engaging a biasing member. Engaging member 600 also includes protrusions 604, which create a textured surface 606. Textured surface 606 more effectively engages other textured surfaces, such as a wire fence, bars of a pen, and so on. FIG. 6B is a front view of alternate engaging member 600, showing the arrangement of protrusions 604 on textured surface 606 in greater detail. Protrusions 604 are arranged in a square, which has a common center with the center of engaging member 600. Additionally, engaging member 600 includes a circular recess 608 for engaging an expandable anchor, such as anchor 208.

Figure 7:
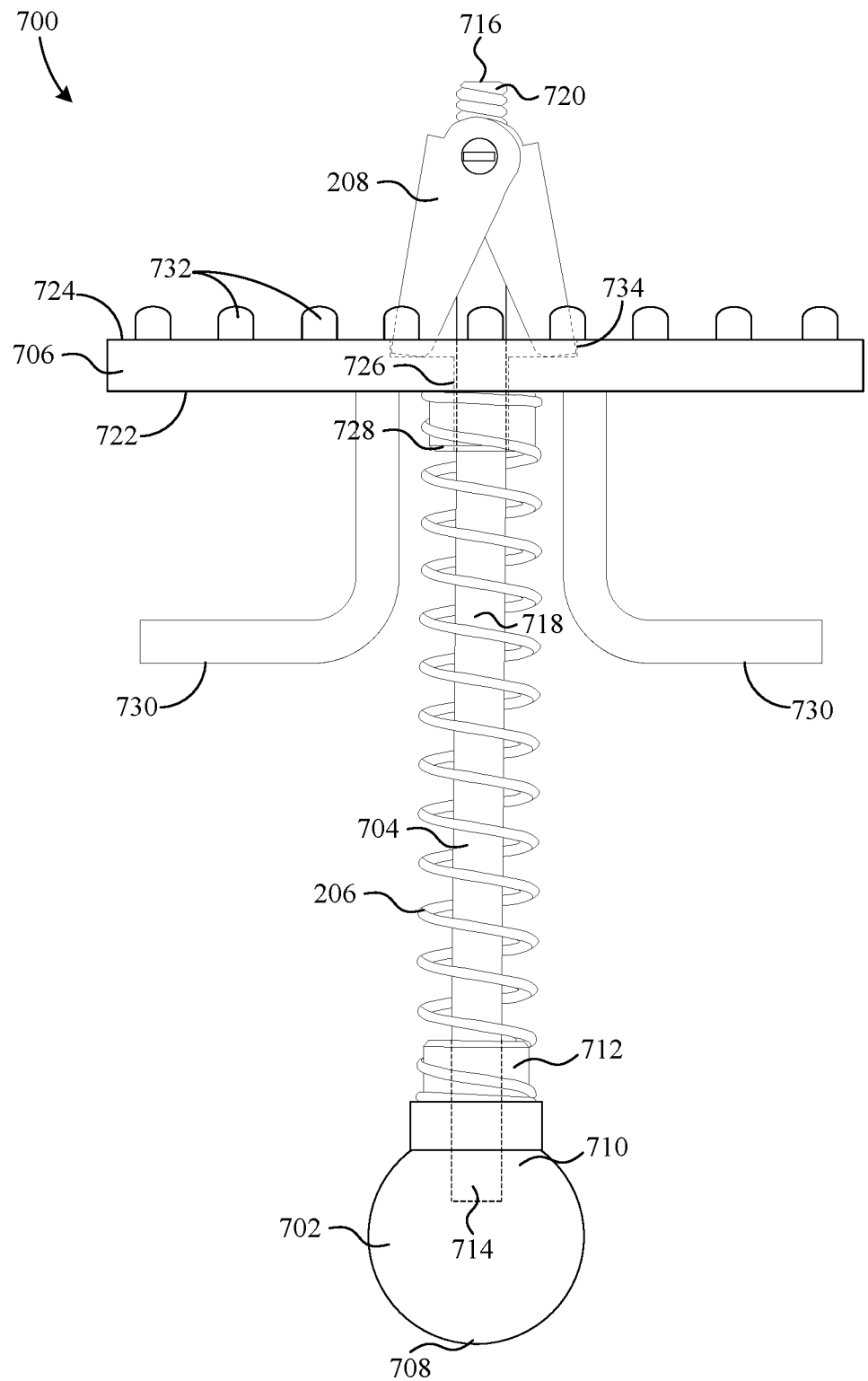
FIG. 7 is a side view of an alternate fastener.

FIG. 7 shows a side view of an alternate fastener 700 in a loaded state. Fastener 700 is substantially similar to fastener 100 and, therefore, like elements are denoted with like reference numbers and are not described again to avoid redundancy.

Fastener 700 includes a push member 702, a rigid shaft 704, an engaging member 706, biasing member 206, and anchor 208. Push member 702 and anchor 208 are coupled to opposite ends of rigid shaft 704. Engaging member 706 is slidably disposed on rigid shaft 704 between push member 702 and anchor 208. Biasing member 206 is disposed between push member 702 and engaging member 706.

In this particular embodiment, push member 702 is an ellipsoid (e.g., spherical) having a first end 708 and a second end 710. First end 708 is rounded to comfortably engage the palm of a user's hand to disperse force exerted thereon when push member 702 is urged against. Second end 710 includes a biasing member seat 712 onto which biasing member 206 is stabilized and centered with respect to rigid shaft 704.

Rigid shaft 704 includes a first end 714, a second end 716, and an intermediate section 718 disposed therebetween. First end 714 is fixed to push member 702 by some suitable means such as, for example, adhesive, threads, etc. Second end 716 includes a thread set 720 onto which anchor 208 is threaded. Intermediate section 718 is smooth to facilitate the sliding of engaging member 706 thereon.

Engaging member 706 includes a first side 722, a second side 724, and an aperture 726 passing therebetween. First side 722 includes a biasing member seat 728 onto which biasing member 206 is seated and centered with respect to aperture 726. Second side 724 further includes a set of pull members 730, which facilitate compressing biasing member 206 with a single hand. To compress biasing member 206, a user first engages tension members 730 with their fingers and push member 702 with their palm. Then, the user squeezes, thereby urging engaging member 706 toward push member 702, against the opposing force of biasing member 206. This feature is particularly useful in releasing fastener 700 from an opening in an object, because it releases the pressure between anchor 208 and whatever is being secured to the object such as, for example, feeder 102. Once the pressure is released, the user can urge anchor 208 back into a collapsed position with their free hand so that it can be backed out of the opening in which it was disposed. Second side 724 is configured to urge against a wall, cage bars, pen, etc. In this example, second side 724 includes an array of protrusions 732 and a recess 734. Protrusions 732 effectively engage textured surfaces such as, for example, cage bars, textured walls, etc. Of course, the spring force can be selected so that second side 724 can also effectively engage smooth surfaces. Recess 734 is identical to recess 400 in functionality and is, therefore, not described again. Aperture 726 is configured to receive smooth intermediate section 718 of shaft 704, so that engaging member 706 can slide along intermediate section 718.

Figure 8:
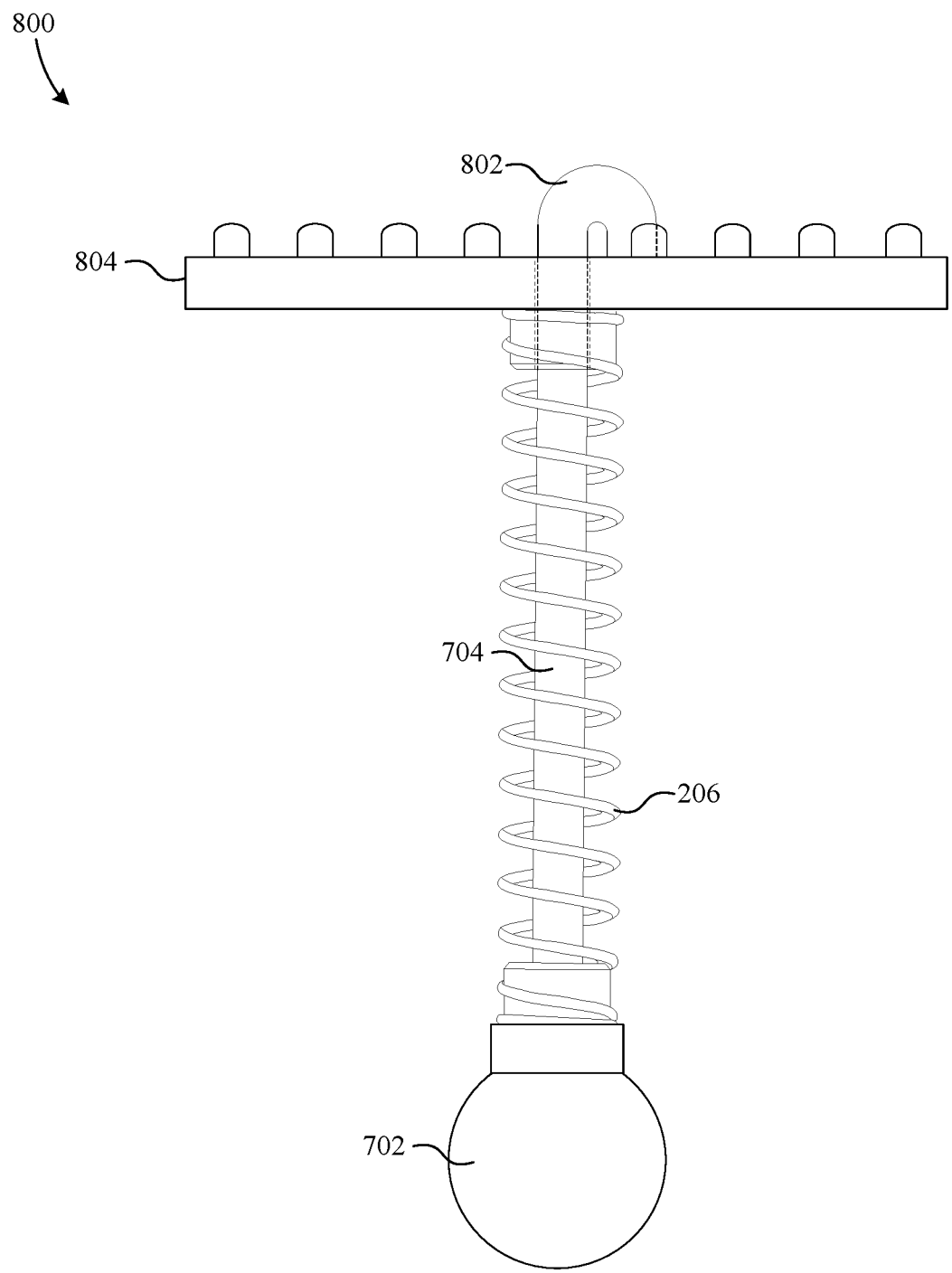
FIG. 8 is a side view of another alternate fastener.

FIG. 8 shows a side view of another alternate fastener 800. Fastener 800 is substantially similar to fastener 700. Therefore, like elements are denoted with like reference numbers and will not be described in detail again to avoid redundancy. The main difference between fastener 800 and fastener 700 is that anchor 208 of fastener 700 has been replaced with an anchor 802 and engaging member 706 has been replaced with engaging member 804.

Anchor 802 is a 180 degree bend in second end 716 of rigid shaft 704 to form a J-hook. Anchor 802 is configured to be inserted into an elongated opening formed in an object (e.g., feeder, storage dish, etc.). Once inserted through the elongated opening, push member 702 is rotated 90 degrees such that it is misaligned with the opening and, therefore, cannot be removed from the opening unless push member 702 is rotated back 90 degrees. In a scenario in which the opening in the object to be secured is not elongated, the object may include a recess to seat the open end of anchor 802. Anchor 802 can be inserted through a round opening and then moved to the side of the opening so that the J-hook can engage the edge of the opening. Anchor 802 can also effectively secure non-planar objects. For example, fastener 800 can be used to secure the wire handle of a bucket to a fence.

Engaging member 804 is substantially identical to engaging member 706 but does not include recess 734 and tensions members 730.

Figure 9:
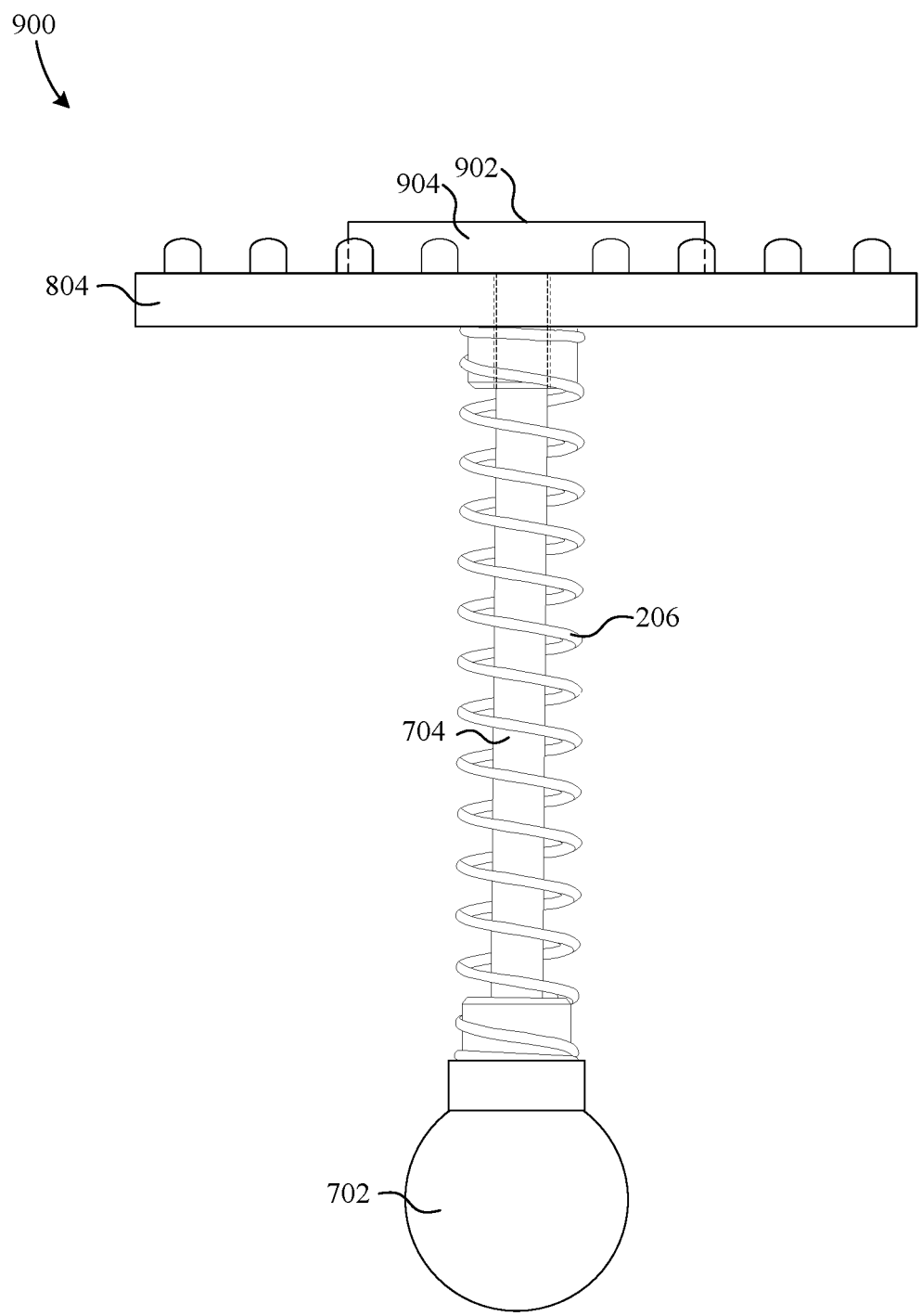
FIG. 9 is a side view of another alternate fastener.

FIG. 9 is a side view of an alternate fastener 900. Fastener 900 is substantially similar to fastener 800. Therefore, like elements are denoted with like reference numbers and are not described again to avoid redundancy. The main difference between fastener 900 and fastener 800 is that anchor 802 of fastener 800 has been replaced with an alternate anchor 902.

Anchor 902 includes a cross-member 904 rigidly attached to second end 716 of rigid shaft 704 to form a T-member. Anchor 902 is configured to be inserted into an elongated opening (e.g., a slot) formed in an object (e.g., feeder, storage dish, etc.). Once inserted through the elongated opening in an aligned first state, push member 702 is rotated such that it is misaligned with the opening (i.e., transitioned into a second state) and, therefore, cannot be removed from the opening unless push member 702 is rotated back and realigned with the opening (first state).

Figure 10:
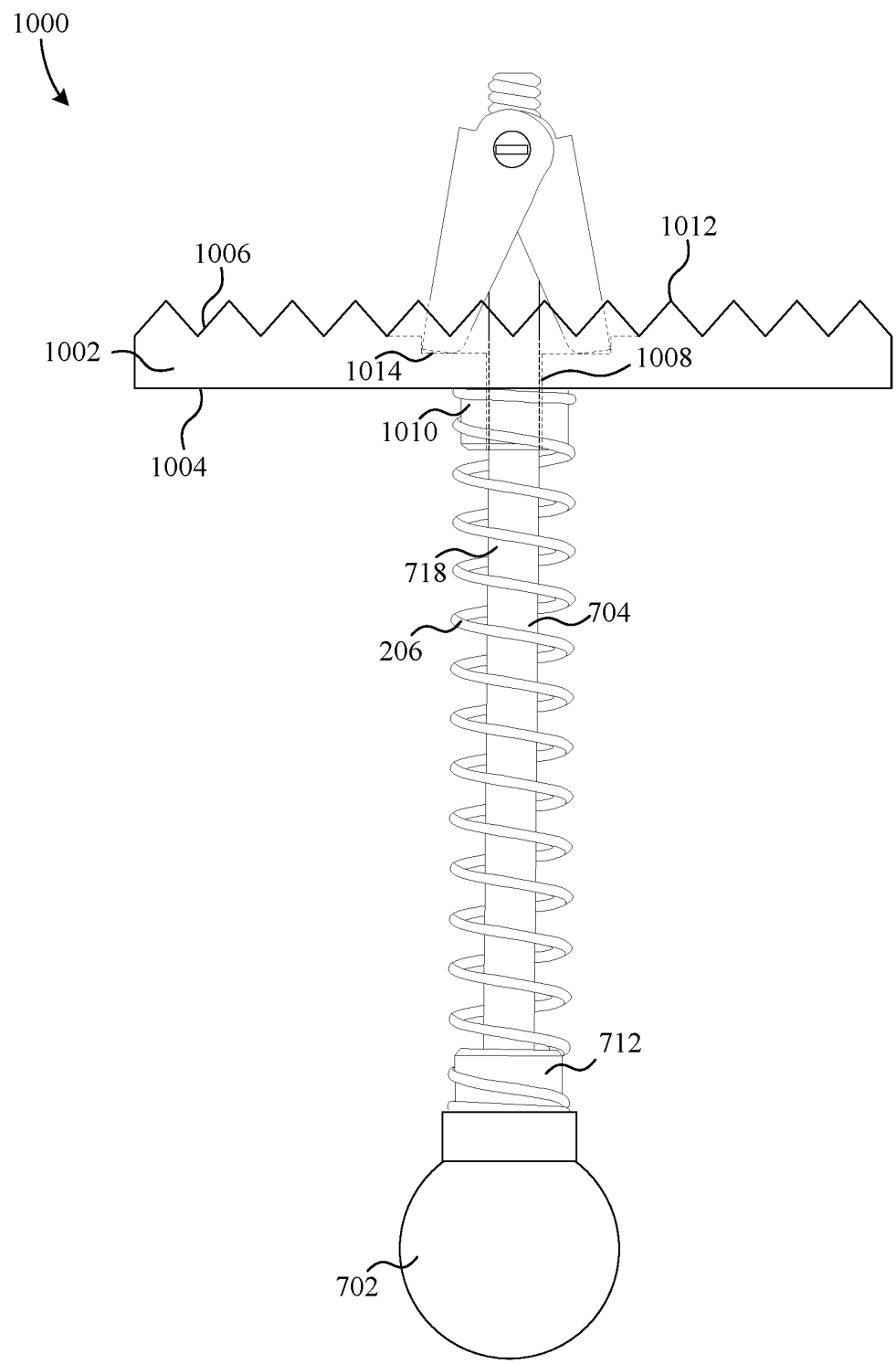
FIG. 10 is a side view of yet another alternate fastener.

FIG. 10 shows a side view of an alternate fastener 1000. Fastener 1000 is substantially similar to fastener 700. Therefore, like elements are denoted with like reference numbers and are not described in detail again to avoid redundancy. The main difference between fastener 1000 and fastener 700 is that engaging member 706 of fastener 700 has been replaced with an alternate engaging member 1002.

Engaging member 1002 includes a first side 1004, a second side 1006, and an aperture 1008 passing therebetween. First side 1004 includes biasing member seat 1010 onto which biasing member 206 is seated and centered with respect to aperture 1008. Second side 1006 includes a plurality of substantially parallel ridges 1012 configured to engage bars of, for example, a cage or the like. Ridges 1012 provide significant friction between engaging member 1002 and bars because of the increased contact surface area therebetween. That is, ridges 1012 protrude into the space between bars so as to engage more area of the outer surface of the bars as compared to a generally planar engaging member. In addition, parallel ridges 1012 positively engage bars (or other substantially parallel structures) to prevent rotation of engaging member 1002 with respect to the bars. Second side 1006 further includes a recess 1014 that functions identical to recess 734 of engaging member 706 by securing anchor 208 in a loaded position. Aperture 1008 is configured to slide along intermediate section 718 of shaft 704.

Figure 11:
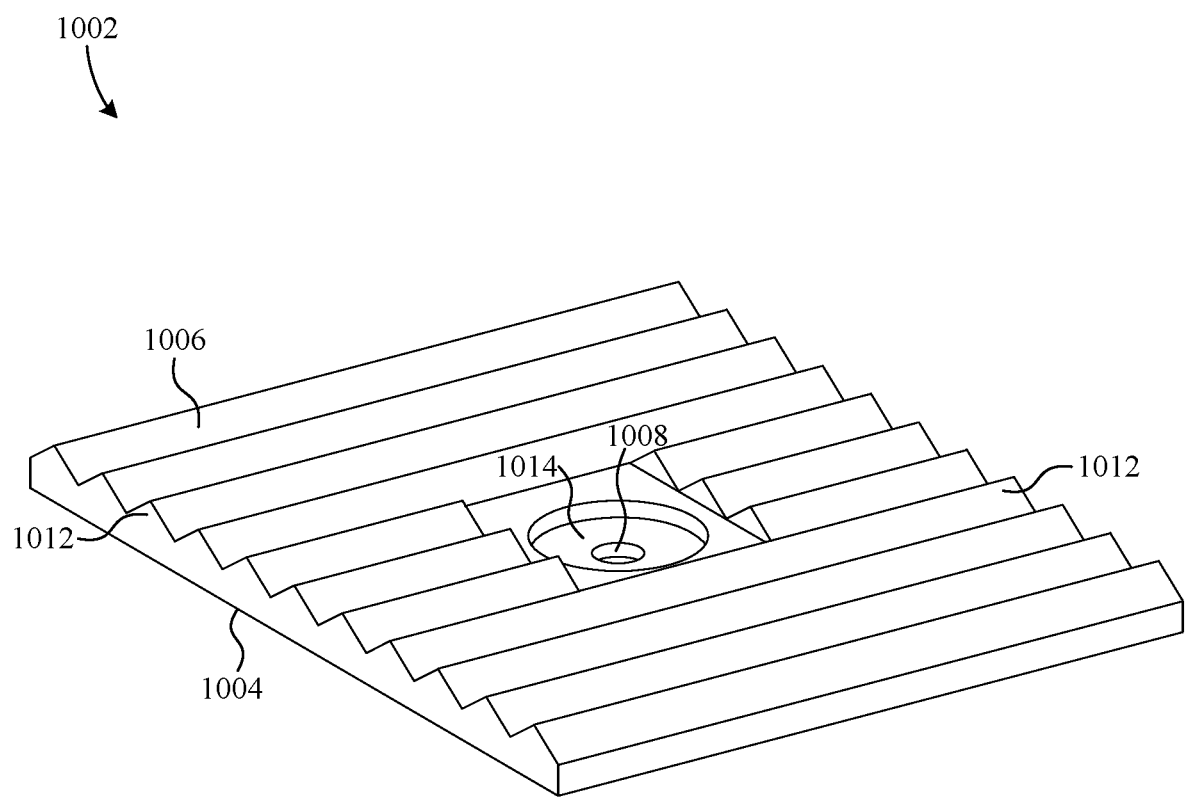
FIG. 11 is a top perspective view of the engaging member of the fastener of FIG. 10.

FIG. 11 is a perspective top view of engaging member 1002 shown removed from fastener 1000. As shown, engaging member 1002 has a rectangular outer perimeter to increase surface area contact with bars. Optionally, ridges 1012 can have a rectangular cross-section, as opposed to the triangular cross-section shown in FIG. 11, to provide even stronger engagement with bars disposed in channels between the ridges.

Figure 12:
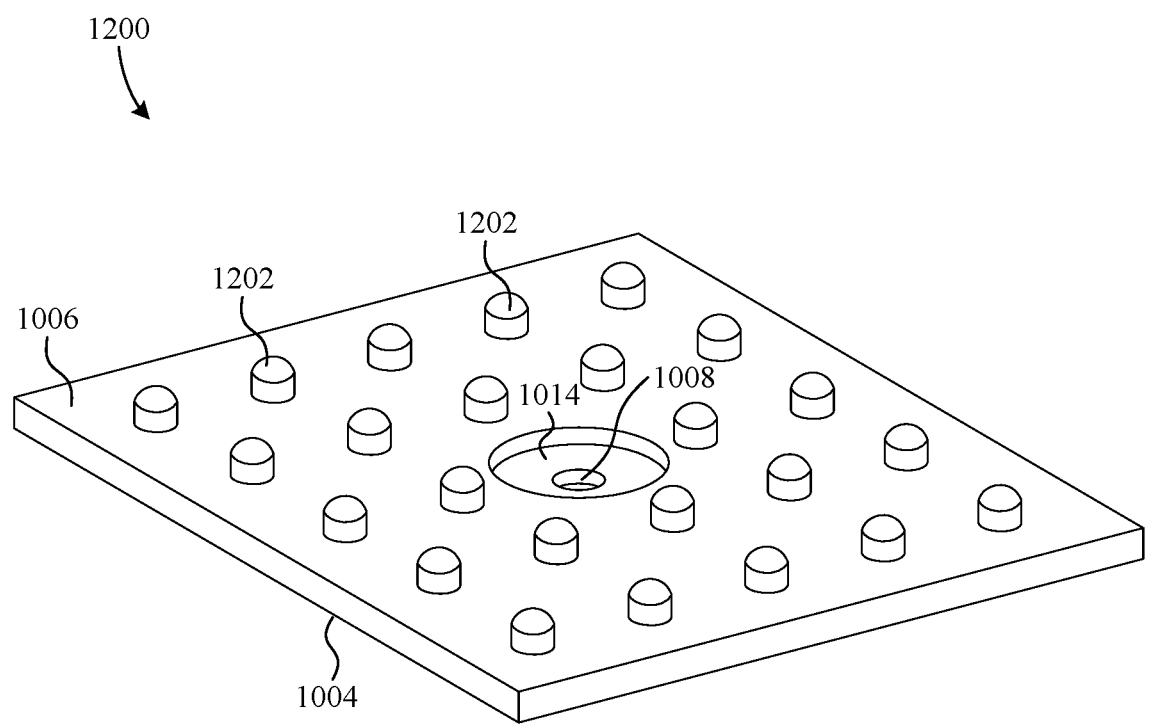
FIG. 12 is a top perspective view of an alternate engaging member.

FIG. 12 is a perspective top view of an alternate engaging member 1200. Engaging member 1200 is substantially similar to engaging member 1002 but includes an array of protrusions 1202, rather than ridges 1012. Like protrusions 604 of engaging member 600, protrusions 1202 effectively engage other textured surfaces, such as wire fences, bars of a pen, and so on.

Figure 13:
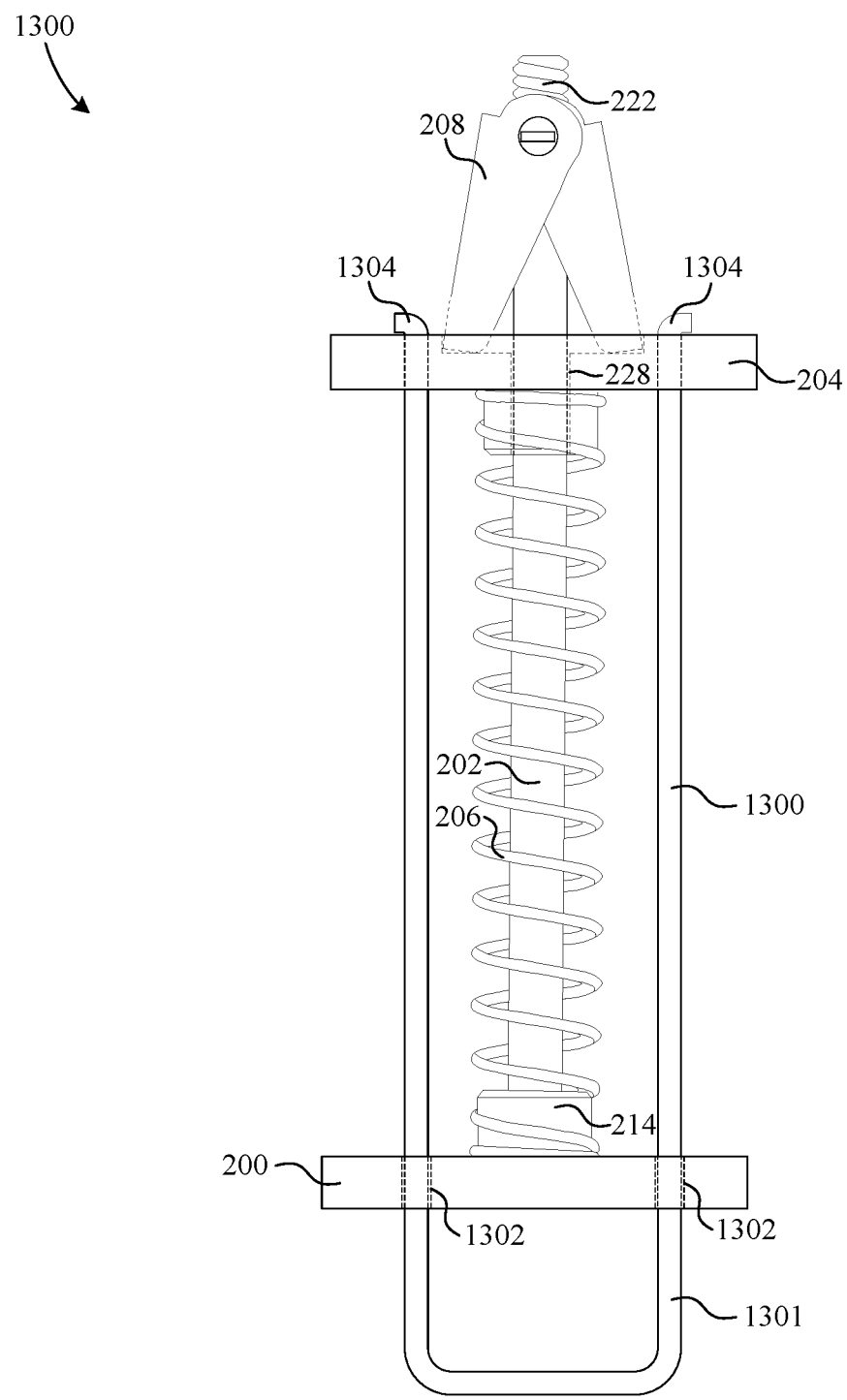
FIG. 13 is a side view of another alternate fastener.

FIG. 13 is a side view of an alternate fastener 1300 further including an alternate pull member 1301. In the example embodiment, pull member 1301 is a U-shaped structure, slidably disposed through a set of apertures 1302 formed in push member 200 and fixably attached to engaging member 204. For example, each side of pull member 1301 passes through engaging member 204 and includes bends 1304 so as to not be pulled through when pull member 1301 is pulled toward push member 200. Optionally, bends 1304 can be eliminated by securing the ends of pull member 1301 within, or to the rear surface, of engaging member 204. Pull member 1300 facilitates the compression of biasing member 206 by providing a structure to pull engaging member 204 toward push member 200. Doing so releases the pressure between anchor 208 and engaging member 204 (or some other engaged object), allowing the user to collapse a deployed anchor 208.

Figure 14:
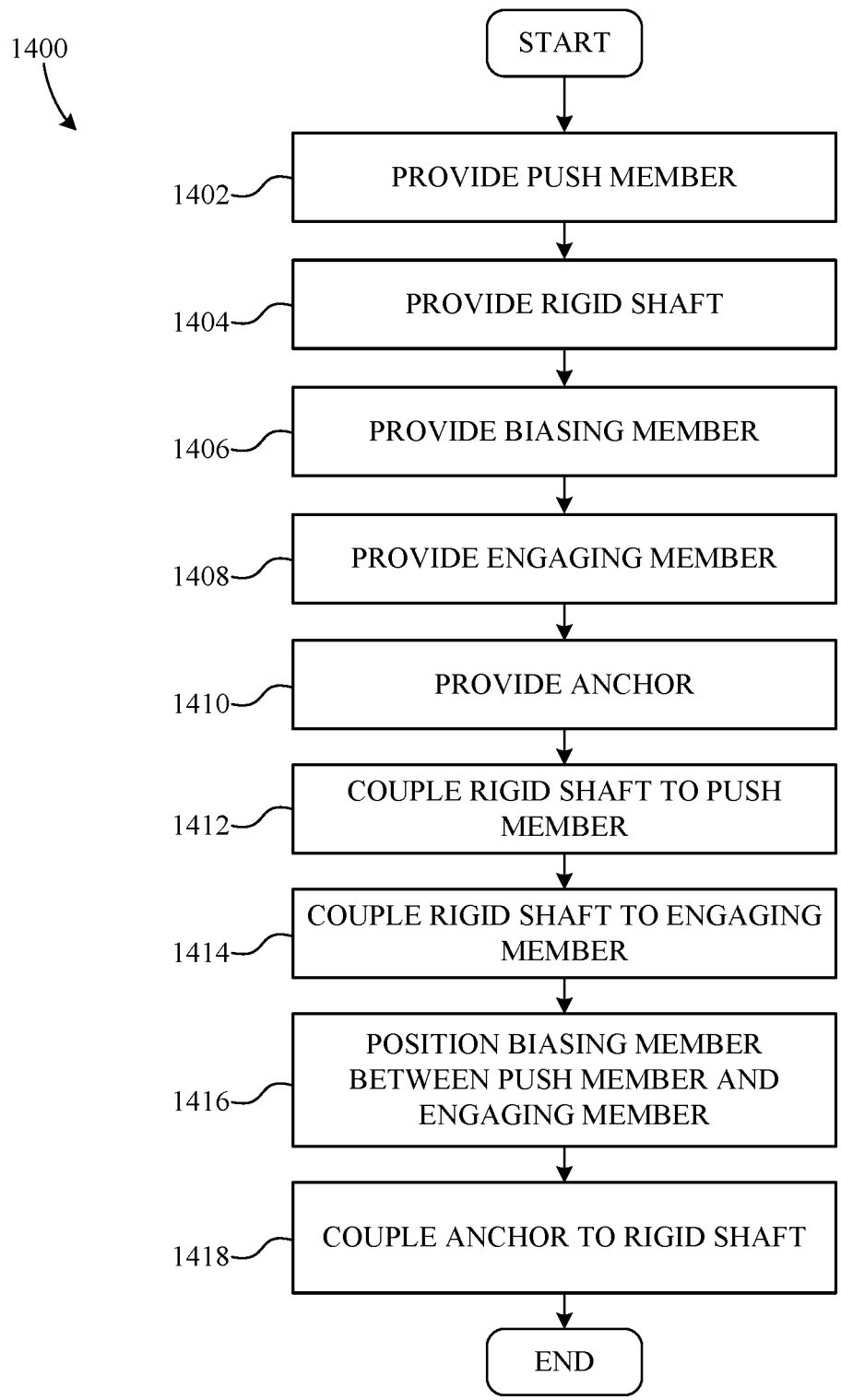
FIG. 14 is a flowchart summarizing an example method of manufacturing a fastener.

FIG. 14 is a flowchart summarizing a method 1400 of manufacturing a fastener. In a first step 1402, a push member is provided. Then, in a second step 1404, a rigid shaft is provided. Next, in a third step 1406, a biasing member is provided. Then, in a fourth step 1408, an engaging member is provided. Next, in a fifth step 1410, an anchor is provided. Then, in a sixth step 1412, the rigid shaft is coupled the push member. Next, in a seventh step 1414, the rigid shaft is coupled to the engaging member. Then, in an eighth step 1416, the biasing member is positioned between the push member and the engaging member. Finally, in a ninth step 1418, the anchor is coupled to the rigid shaft. The specific order of the steps can be altered, depending on the specific configuration of each component part.

Figure 15:
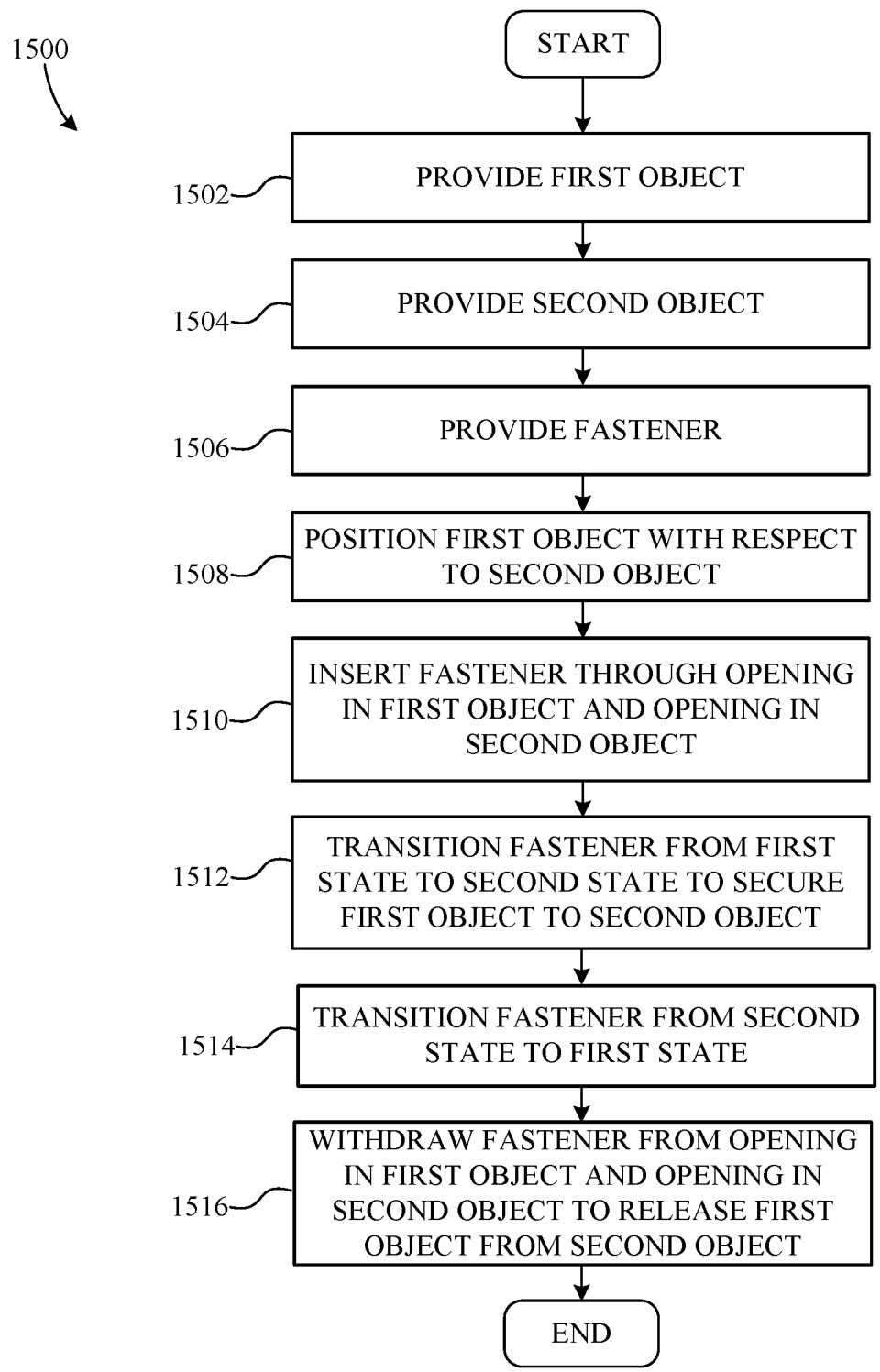
FIG. 15 is a flowchart summarizing an example method of using a fastener.

FIG. 15 is a flowchart summarizing a method 1500 of using a fastener. In a first step 1502, a first object is provided. Then, in a second step 1504, a second object is provided. Next, in a third step 1506, a fastener is provided. Then, in a third step 1508, the first object is positioned with respect to the second object. Next, in a fourth step 1510, the fastener is inserted through an opening in the first object and an opening in the second object. Then, in a fifth step 1512, the fastener is transitioned from a first state to a second state, to secure the first object to the second object. Next, in a seventh step 1514, the fastener is transitioned from the second state back to the first state. Then, in an eighth step 1516, the fastener is withdrawn from the opening in the first object and the opening in the second object, to detach the first object from the second object. Instructions that teach or suggest to a user how to fasten one object to another (e.g., perform method 1500 or similar method) can be provided with any fastener disclosed herein.

Various embodiments of the fastener disclosed herein provide important advantages over devices of the prior art. For example, the use of the device can be accomplished primarily from the outside of a farrowing crate (or other enclosure or structure), making it easy to use. In addition, the portion of the device that creates the biasing force is located outside of the farrowing crate, keeping it safely away from the livestock inside the farrowing crate. Yet another advantage is that the portion of the securement device positioned inside the farrowing crate (i.e., anchor 208) provides a means for quick release of feeder 102 from the fastener 100 and a quick release of fastener 100 from wall 104.

The description of particular embodiments of the present invention is now complete. Many of the described features may be substituted, altered or omitted without departing from the scope of the invention. For example, alternate shafts (e.g., a completely smooth rod), may be substituted for the bolt of fastener 100. As another example, fasteners described herein can be used to attach different items together (e.g., bins/containers for supplies/parts in a contractor's van) This and other deviations from the particular embodiments shown will be apparent to those skilled in the art, particularly in view of the foregoing disclosure.

I claim:

1. A fastener for securing a first object to a second object, said fastener comprising:

a push member having a first side and an opposite second side, said first side including a surface configured to disperse force exerted thereon by a user;

a rigid shaft having a first end and a second end, said first end of said rigid shaft being coupled to said second side of said push member;

an engaging member coupled to slide along said shaft, said engaging member defining an aperture and including a first side and an opposite second side, said rigid shaft extending through said aperture, and said second side of said engaging member configured to abut a surface of said first object;

a biasing member disposed between said push member and said engaging member, said biasing member urging said engaging member along said rigid shaft in a direction away from said push member; and an anchor coupled to said second end of said rigid shaft, said anchor configured to pass through an opening in said first object and an opening in said second object when said anchor is in a first state and to prevent passage of said anchor through said opening in said first object and said opening in said second object when said anchor is in a second state, said anchor being transitionable between said second state and said first state by said user to facilitate the withdrawal of said anchor through said opening in said first object and said opening in said second object; and wherein said second side of said engaging member is rectangular; and said second side of said engaging member includes a plurality of parallel ridges.

2. The fastener of claim 1, wherein the outer diameter of said rigid shaft is less than half the outer diameter of said push member.

3. The fastener of claim 1, wherein said second side of said push member further includes a first biasing member seat configured to position said biasing member with respect to said push member.

4. The fastener of claim 3, wherein:
said biasing member is a compression spring having a first end and a second end;
said first biasing member seat is configured to seat said first end of said compression spring; and
said first side of said engaging member further includes a second biasing member seat configured to seat said second end of said compression spring to said engaging member.

5. The fastener of claim 1, wherein said push member includes an ellipsoidal surface.

6. The fastener of claim 1, further including a pull mechanism coupled to said engaging member to facilitate movement of said engaging member toward said push member and the compression of said biasing member.

7. The fastener of claim 6, wherein:
said push member defines an aperture passing therethrough; and
a portion of said pull mechanism is slidably disposed through said aperture defined by said push member.

8. The fastener of claim 6, wherein said pull mechanism is coupled to said first side of said engaging member and defines a surface configured to be engaged by at least one of said user's fingers.

9. The fastener of claim 1, wherein
said rigid shaft includes a smooth section, and
said engaging member is positioned to slide along said smooth section of said rigid shaft.

10. The fastener of claim 1, wherein said second end of said rigid shaft is permanently fixed to said anchor.

11. The fastener of claim 1, wherein:
said second end of said rigid shaft includes a first set of threads; and
said anchor includes a second set of threads complimentary to said first set of threads.

12. The fastener of claim 11, wherein said first seat of threads are fouled to prevent said anchor from being removed from said rigid shaft.

13. The fastener of claim 1, wherein the outer diameter of said engaging member is greater than the outer diameter of said anchor when said anchor is in said second state.

14. The fastener of claim 1, wherein:
said anchor is deployable from a loaded state to a deployed state, said anchor being in said first state when said anchor is in said loaded state and said anchor being in said second state when said anchor is in said deployed state; and
said engaging member includes a securing feature configured to secure said anchor in said loaded state.

15. The fastener of claim 14, wherein said securing feature includes a recess in said second side of said engaging member.

16. The fastener of claim 1, wherein said second side of said engaging member defines a plurality of protrusions configured to engage said first object.

17. The fastener of claim 1, wherein said anchor includes a biasing member configured to automatically deploy said anchor.

18. The fastener of claim 17, wherein said anchor includes a pair of hinged wings biased toward a spread position by said biasing member of said anchor.

19. The fastener of claim 1, wherein said anchor includes a bend formed in said second end of said rigid shaft.

20. The fastener of claim 1, wherein said biasing member includes a coil spring disposed around said rigid shaft.

21. The fastener of claim 1, wherein said anchor includes a rigid cross-member rigidly attached to said second end of said rigid shaft.

22. The fastener of claim 21, wherein said anchor is a T-member.

23. The fastener of claim 1, further comprising instructions for using said fastener to secure said first object to said second object between said anchor and said engaging member.

24. A method of manufacturing a fastener for securing a first object to a second object, said method comprising:
providing a push member having a first side and an opposite second side, said first side including a surface configured to disperse force exerted thereon by a user;
providing a rigid shaft having a first end and a second end;
coupling said first end of said rigid shaft to said second side of said push member;
providing an engaging member defining an aperture and including a first side and an opposite second side, said second side of said engaging member being configured to abut a surface of said first object and defining a plurality of parallel ridges;
disposing said rigid shaft through said aperture defined by said engaging member such that said engaging member is slidably coupled to said rigid shaft;
providing a biasing member;
disposing said biasing member between said push member and said engaging member such that said biasing member urges said engaging member along said rigid shaft in a direction away from said push member;

providing an anchor configured to pass through an opening in said first object and an opening in said second object when said anchor is in a first state and to prevent passage of said anchor through said opening in said first object and said opening in said second object when said anchor is in a second state, said anchor being transitionable between said second state and said first state by said user to facilitate the withdrawal of said anchor through said opening in said first object and said opening in said second object; and coupling said anchor to said second end of said rigid shaft.

25. The method of claim 24, wherein the outer diameter of said rigid shaft is less than half the outer diameter of said push member.

26. The method of claim 24, wherein:
said rigid shaft includes a smooth section disposed between said first end and said second end of said rigid shaft; and
said step of disposing said rigid shaft through said aperture of said engaging member includes disposing said smooth section of said rigid shaft through said aperture of said engaging member such that said engaging member is slidable along said smooth section of said rigid shaft.

27. The method of claim 24, wherein said anchor is deployable from a loaded state to a deployed state, said anchor being in said first state when said anchor is in said loaded state and said anchor being in said second state when said anchor is in said deployed state.

28. The method of claim 27, wherein said anchor includes a pair of hinged wings biased toward a spread position by a biasing member of said anchor.

29. The method of claim 27, wherein said engaging member includes a securing feature configured to secure said anchor in said loaded state.

30. The method of claim 29, wherein said securing feature includes a recess formed in said second side of said engaging member.

31. The method of claim 24, wherein said second side of said engaging member includes a plurality of protrusions.

32. The method of claim 24, wherein said engaging member is generally rectangular.

33. The method of claim 24, wherein said step of disposing a biasing member between said push member and said engaging member includes placing a coil spring around said rigid shaft.

34. A detachable container system comprising:
a container defining an opening passing therethrough; and
a fastener for securing said container to an object, said fastener including a rigid shaft having a first end and a second end,
an engaging member coupled to slide along said shaft, said engaging member defining an aperture and including a first side and an opposite second side, said rigid shaft extending through said aperture, and said second side of said engaging member configured to abut a surface of said object,
a biasing member disposed between said first end of said rigid shaft and said engaging member, said biasing member urging said engaging member along said rigid shaft in a direction away from said first end of said rigid shaft, and an anchor coupled to said second end of said rigid shaft, said anchor configured to pass through an opening in said object and said opening in said container when said anchor is in a first state and to prevent passage of said anchor through said opening in said container and said opening in said object when said anchor is in a second state, said anchor being transitionable between said second state and said first state by said user to facilitate the withdrawal of said anchor through said opening in said container and said opening in said object;
and wherein
said object includes a plurality of bars;
said opening in said object is a space between said bars of said object; and
said second side of said engaging member is configured to engage said bars of said object.

35. The detachable container system of claim 34, wherein said fastener further includes a push member having a first side and an opposite second side;
said first side of said push member includes a surface configured to disperse force exerted thereon by a user; and
said rigid shaft extends between said second side of said push member and said engaging member.

36. The detachable container system of claim 34, wherein said second side of said engaging member defines a plurality of protrusions configured to engage said bars of said object.

37. The detachable container system of claim 34, wherein said second side of said engaging member defines a plurality of parallel ridges configured to engage said bars of said object.

38. The detachable container system of claim 34, wherein:
said anchor includes a cross member coupled to said second end of said rigid shaft;
said opening in said container is an elongated aperture;
said cross member is aligned with said elongated aperture of said container when said anchor is in said first state;
said cross member is misaligned with said elongated aperture of said container when said anchor is in said second state; and
said anchor is transitioned from said first state to said second state by rotating said rigid shaft while said rigid shaft is disposed through said opening in said object and said elongated aperture.

39. The detachable container system of claim 38, wherein said container includes a feature for securing said anchor in said second state when said engaging member abuts said object.

40. The detachable container of system of claim 34, wherein said container is a feeder.

41. A fastener for securing a first object to a second object, said fastener comprising:
a push member having a first side and an opposite second side, said first side including a surface configured to disperse force exerted thereon by a user;
a rigid shaft having a first end and a second end, said first end of said rigid shaft being coupled to said second side of said push member;
an engaging member coupled to slide along said shaft, said engaging member defining an aperture and including a first side and an opposite second side, said rigid shaft extending through said aperture, and said second side of said engaging member configured to abut a surface of said first object;
a biasing member disposed between said push member and said engaging member, said biasing member urging said engaging member along said rigid shaft in a direction away from said push member;

a pull mechanism coupled to said engaging member to facilitate movement of said engaging member toward said push member and the compression of said biasing member; and an anchor coupled to said second end of said rigid shaft, said anchor configured to pass through an opening in said first object and an opening in said second object when said anchor is in a first state and to prevent passage of said anchor through said opening in said first object and said opening in said second object when said anchor is in a second state, said anchor being transitionable between said second state and said first state by said user to facilitate the withdrawal of said anchor through said opening in said first object and said opening in said second object; and wherein said push member defines an aperture passing therethrough; and a portion of said pull mechanism is slidably disposed through said aperture defined by said push member.

42. The fastener of claim 41, wherein the outer diameter of said rigid shaft is less than half the outer diameter of said push member.

43. The fastener of claim 41, wherein said second side of said push member further includes a first biasing member seat configured to position said biasing member with respect to said push member.

44. The fastener of claim 43, wherein:
said biasing member is a compression spring having a first end and a second end;
said first biasing member seat is configured to seat said first end of said compression spring; and
said first side of said engaging member further includes a second biasing member seat configured to seat said second end of said compression spring to said engaging member.

45. The fastener of claim 41, wherein
said rigid shaft includes a smooth section, and
said engaging member is positioned to slide along said smooth section of said rigid shaft.

46. The fastener of claim 41, wherein said second end of said rigid shaft is permanently fixed to said anchor.

47. The fastener of claim 41, wherein:
said second end of said rigid shaft includes a first set of threads; and
said anchor includes a second set of threads complimentary to said first set of threads.

48. The fastener of claim 47, wherein said first seat of threads are fouled to prevent said anchor from being removed from said rigid shaft.

49. The fastener of claim 41, wherein the outer diameter of said engaging member is greater than the outer diameter of said anchor when said anchor is in said second state.

50. The fastener of claim 41, wherein:
said anchor is deployable from a loaded state to a deployed state, said anchor being in said first state when said anchor is in said loaded state and said anchor being in said second state when said anchor is in said deployed state; and
said engaging member includes a securing feature configured to secure said anchor in said loaded state.

51. The fastener of claim 50, wherein said securing feature includes a recess in said second side of said engaging member.

52. The fastener of claim 41, wherein said second side of said engaging member defines a plurality of protrusions configured to engage said first object.

53. The fastener of claim 41, wherein said second side of said engaging member is rectangular.

54. The fastener of claim 53, wherein said second side of said engaging member includes a plurality of parallel ridges.

55. The fastener of claim 41, wherein said anchor includes a biasing member configured to automatically deploy said anchor.

56. The fastener of claim 55, wherein said anchor includes a pair of hinged wings biased toward a spread position by said biasing member of said anchor.

57. The fastener of claim 41, wherein said anchor includes a bend formed in said second end of said rigid shaft.

58. The fastener of claim 41, wherein said biasing member includes a coil spring disposed around said rigid shaft.

59. The fastener of claim 41, wherein said anchor includes a rigid cross-member rigidly attached to said second end of said rigid shaft.

60. The fastener of claim 59, wherein said anchor is a T-member.

61. The fastener of claim 41, further comprising instructions for using said fastener to secure said first object to said second object between said anchor and said engaging member.

62. A detachable container system comprising:
a container defining an opening passing therethrough; and
a fastener for securing said container to an object, said fastener including
a rigid shaft having a first end and a second end,
an engaging member coupled to slide along said shaft, said engaging member defining an aperture and including a first side and an opposite second side, said rigid shaft extending through said aperture, and said second side of said engaging member configured to abut a surface of said object,
a biasing member disposed between said first end of said rigid shaft and said engaging member, said biasing member urging said engaging member along said rigid shaft in a direction away from said first end of said rigid shaft, and
an anchor coupled to said second end of said rigid shaft, said anchor configured to pass through an opening in said object and said opening in said container when said anchor is in a first state and to prevent passage of said anchor through said opening in said container and said opening in said object when said anchor is in a second state, said anchor being transitionable between said second state and said first state by said user to facilitate the withdrawal of said anchor through said opening in said container and said opening in said object;
and wherein
said anchor includes a cross member coupled to said second end of said rigid shaft;
said opening in said container is an elongated aperture;
said cross member is aligned with said elongated aperture of said container when said anchor is in said first state;
said cross member is misaligned with said elongated aperture of said container when said anchor is in said second state; and
said anchor is transitioned from said first state to said second state by rotating said rigid shaft while said rigid shaft is disposed through said opening in said object and said elongated aperture.

63. The detachable container system of claim 62, wherein said second side of said engaging member is configured to receive bars of said object.

* * * * *